United States Patent
Schmid

[11] Patent Number: 5,103,772
[45] Date of Patent: Apr. 14, 1992

[54] PET POTTY

[76] Inventor: Hans G. Schmid, 26 Locust La., Huntington, N.Y. 11743

[21] Appl. No.: 651,540

[22] Filed: Feb. 6, 1991

[51] Int. Cl.$^5$ ............................................. A01K 29/00
[52] U.S. Cl. ......................................... 119/162; 4/239
[58] Field of Search ............... 119/162, 161, 165, 163; 4/300.3, 445, 239, 238, 315

[56] References Cited

U.S. PATENT DOCUMENTS

| | | | |
|---|---|---|---|
| 2,053,594 | 9/1936 | Albert | 119/162 |
| 2,446,381 | 8/1948 | Middleton | 4/239 |
| 3,111,932 | 11/1963 | Knutson | 119/165 |
| 3,688,741 | 9/1972 | Thompson et al. | 119/165 |
| 3,688,742 | 9/1972 | McGee | 119/162 |
| 4,181,096 | 1/1980 | Grubman | 119/162 |
| 4,231,321 | 11/1980 | Cohen | 119/162 |
| 4,271,544 | 6/1981 | Hammond | 119/162 |

FOREIGN PATENT DOCUMENTS 2741562  3/1979  Fed. Rep. of Germany ...... 119/162

Primary Examiner—Robert P. Swiatek
Assistant Examiner—Todd E. Manahan
Attorney, Agent, or Firm—Richard L. Miller

[57] ABSTRACT

A toilet training device for pets consists of a pet seat having a plurality of legs extending downwardly from the underside. A separable container is slideably mounted to the underside of the pet seat, so that when the pet seat is placed onto a flat surface, the separable container can be put into a closed position to catch the feces and urine from the pet. When the pet seat is placed onto the rim of a regular toilet bowl, the separable container can be put into an opened position to allow the feces and urine from the pet to enter the toilet bowl.

5 Claims, 1 Drawing Sheet

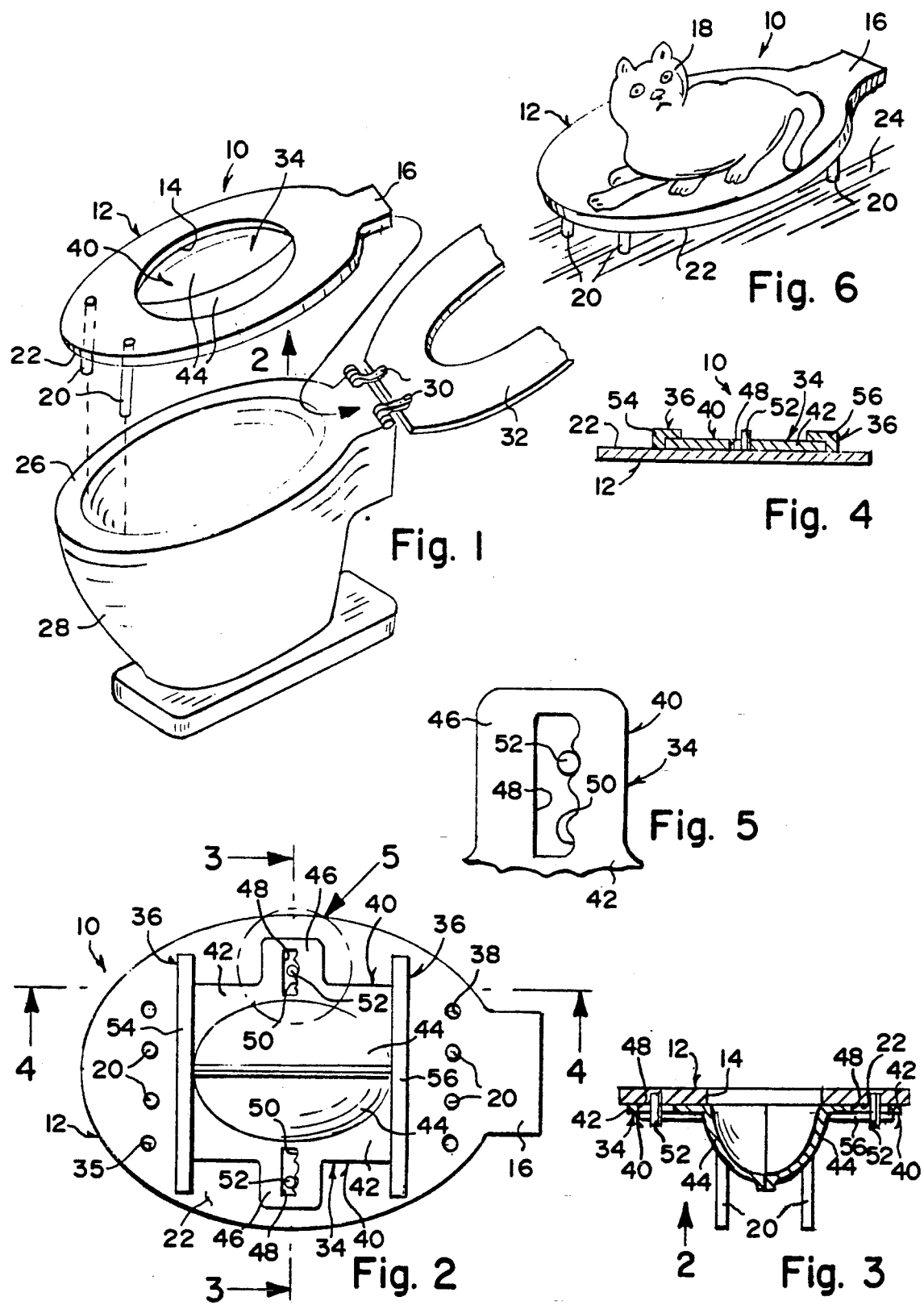

5,103,772

PET POTTY

BACKGROUND OF THE INVENTION

The instant invention relates generally to pet potty toilets and more specifically it relates to a toilet training device for pets.

Numerous pet toilets have been provided in the prior art that are adapted to allow pets to defecate and urinate utilizing the pet toilet. For example, U.S. Pat. Nos. 3,734,057 to Lee et al.; 3,937,182 to Kamimura and Des. 271,435 to Kullenback all are illustrative of such prior art. While these units may be suitable for the particular purpose to which they address, they would not be as suitable for the purpose of the present invention as hereafter described.

SUMMARY OF THE INVENTION

A primary object of the present invention is to provide a toilet training device for pets that will overcome the shortcomings of the prior art devices.

Another object is to provide a toilet training device for pets that can be placed onto the floor and contains a separable container which when closed will catch the feces and urine of that pet so that the pet can be trained to use the device.

An additional object is to provide a toilet training device for pets that will fit conveniently onto a regular toilet bowl, so that the pet will be trained to defecate and urinate into the toilet bowl.

A further object is to provide a toilet training device for pets that is simple and easy to use.

A still further object is to provide a toilet training device for pets that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view illustrating the instant invention being mounted on a toilet bowl;

FIG. 2 is a bottom view taken in direction of arrow 2 in FIGS. 1 and 3 on the instant invention per se;

FIG. 3 is a cross sectional view taken along line 3—3 in FIG. 2;

FIG. 4 is a cross sectional view taken along line 4—4 in FIG. 2;

FIG. 5 is an enlarged view as indicated by arrow 5 in FIG. 2; and

FIG. 6 is a perspective view illustrating a pet utilizing the instant invention on the floor.

DETAILED DESCRIPTION OF THE PREFERRED EMBODIMENTS

Turning now descriptively to the drawings, in which like reference characters denote like elements throughout the several views, the Figures illustrate a toilet training device 10 for pets consisting of a pet seat 12 having a central aperture 14 and a rest flange 16 so that a pet 18, such as a cat, can sit thereupon. A plurality of legs 20 extend downwardly from the underside 22 of the pet seat 12, so that in one instance the pet seat 12 can be placed elevated onto a flat surface 24, such as a floor, and in another instance the pet seat 12 can be placed onto the rim 26 of a regular toilet bowl 28 with the legs 20 extending into the bowl 28 and the rest flange 16 positioned between the hinges 30 of an opened toilet seat 32. A separable container 34 is provided, with a mechanism 36 for slideably mounting the separable container 34 to the underside 22 of the pet seat 12. When the pet seat 12 is placed onto the flat surface 24, the separable container can be put into a closed position to catch the feces and urine from the pet 18. When the pet seat 12 is placed onto the rim 26 of the regular toilet bowl 28 the separable container 34 can be separated into an opened position to allow feces and urine from the pet 18 to enter the toilet bowl 28.

The pet seat 12 further has a first set of spaced apart recessed holes 35, transversely positioned in front of the central aperture 14 and a second set of spaced apart recessed holes 38 transversely positioned in back of the central aperture 14. Two of the legs 20 can be adjustably placed into any two of the first set of spaced apart recessed holes 35 and two of the legs 20 can be adjustably placed into any two of the second set of spaced apart recessed holes 38 to compensate for various sized toilet bowls 28.

The separable container 34 includes two mating segments 40 with each having a flat portion 42 and a half concave portion 44. When the two mating segments 40 are placed together in the closed position the concave portions 44 will come together to catch the feces and urine from pet 18. Each flat portion 42 on each mating segment 40 has a flat arm 46 extending outwardly therefrom with a slot 48 therein. The slot 48 has a plurality of indentations 50 along one side thereof. A pair of pins 52 are provided with each pin 52 extending downwardly from the underside 22 of the pet seat so as to engage with one of the indentations 50 in the slot 48. Each mating segment 40 can be adjusted accordingly to the engagement of the respective pin 52 to one of the indentations 50 in the slot 48.

The slideably mounting mechanism 36 includes a pair of tracks 54 and 56. The first track 54 is secured to the underside 22 of the pet seat 12 between the first set of recessed holes 35 and the central aperture 14. The second track 56 is secured to the underside 22 of the pet seat 12 between the second set of recessed holes 38 and the central aperture 14. Each flat portion 42 of each mating segment 40 of the separable container 34 can slide within the tracks 54 and 56.

In operative use the toilet training device 10 is generally used to train a pet 18 when young, by first keeping the device 10 on the floor 24 with the separable container 34 in a closed position. When the pet matures slightly the location of the device is than changed to a desired toilet 28 and after the pet over comes its fear of the device 10 being on the toilet 28 the separable mating segments 40 of the container 34 are gradually separated so that the pet 18 is eventually defecating substantially directly into the toilet. At this point the device 10 can be discarded and the pet 18 can continue to defecate in the toilet 28 without the aid of the instant invention 10.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A toilet training device for pets which comprises:
   a) a pet seat having a central aperture and a rest flange so that a pet can sit thereupon;
   b) a plurality of legs extending downwardly from an underside of said pet seat, so that in one instance said pet seat can be placed elevated onto a flat surface and in another instance said pet seat can be placed onto the rim of a regular toilet bowl with said legs extending into the bowl and the rest flange positioned between the hinges of the opened toilet seat;
   c) a separable container; and
   d) means for slideably mounting said separable container to the underside of said pet seat, so that when said pet seat is placed onto the flat surface, said separable container can be put into a closed position to catch feces and urine from the pet, and when said pet seat is placed onto the rim of the regular toilet bowl, said separable container can be separated into an opened position to allow feces and urine from the pet to enter the toilet bowl.

2. A toilet training device for pets as recited in claim 1, wherein said pet seat further has a first set of spaced apart recessed holes transversely positioned in front of the central aperture and a second set of spaced apart recessed holes transversely positioned in back of the central aperture so that two of said legs can be adjustably placed into any two of the first set of spaced apart recessed holes and two of said legs can be adjustably placed into any two of the second set of spaced apart recessed holes to compensate for various sized toilet bowls.

3. A toilet training device for pets as recited in claim 2, wherein said separable container includes two mating segments with each having a flat portion and a half concave portion, so that when said two mating segments are placed together in the closed position, the concave portions will come together to catch feces and urine from the pet.

4. A toilet training device for pets as recited in claim 3, further including:
   a) a flat arm extending outwardly from each said flat portion of each mating segment and having a slot therein, said slot having a plurality of indentations along one side thereof; and
   b) a pair of pins, each extending downwardly from the underside of said pet seat so as to engage with one of the indentations in the slot, whereby each mating segment can be adjusted accordingly by engagement of said respective pin to one of the indentations in the slot.

5. A toilet training device for pets as recited in claim 4, wherein said slideable mounting means includes a first track secured to the underside of said pet seat between the first set of recessed holes and the central aperture and a second track secured to the underside of said pet seat between the second set of recessed holes and the central aperture, so that each said flat portion of each mating segment of said separable container can slide within said tracks.

* * * * *